United States Patent [19]
Yoshida

[11] Patent Number: 5,108,206
[45] Date of Patent: Apr. 28, 1992

[54] DOCUMENT OUTPUTTING APPARATUS INCLUDING MEANS TO RANDOMLY ALTER FONTS

[75] Inventor: Shigeo Yoshida, Tokyo, Japan

[73] Assignee: Canon Kabushiki Kaisha, Tokyo, Japan

[21] Appl. No.: 679,829

[22] Filed: Apr. 1, 1991

Related U.S. Application Data

[63] Continuation of Ser. No. 355,108, May 19, 1989, abandoned, which is a continuation of Ser. No. 52,588, May 20, 1987, abandoned.

[30] Foreign Application Priority Data

May 27, 1986 [JP] Japan ............................. 61-120189

[51] Int. Cl.$^5$ .............................................. B41J 5/30
[52] U.S. Cl. .................................... 400/61; 400/73; 400/121; 340/730; 340/735; 395/110
[58] Field of Search ......................... 400/61, 73, 121; 395/110; 340/730, 735

[56] References Cited

U.S. PATENT DOCUMENTS

| | | | |
|---|---|---|---|
| 4,031,519 | 6/1977 | Findley | 400/65 X |
| 4,349,695 | 9/1982 | Morgan et al. | 379/95 |
| 4,517,598 | 5/1985 | Van Valkenburg et al. | 358/142 |
| 4,594,674 | 6/1986 | Boulia et al. | 364/523 |
| 4,613,945 | 9/1986 | Parker | 340/735 |
| 4,723,836 | 2/1988 | Kono et al. | 340/707 |
| 4,740,904 | 4/1988 | Wagle | 340/730 |
| 4,773,098 | 9/1988 | Scott | 382/21 |
| 4,817,034 | 2/1989 | Hardin, Sr. et al. | 340/728 |

FOREIGN PATENT DOCUMENTS 154082 8/1985 Japan .

OTHER PUBLICATIONS

Matushita Electric, "Panaword," Oct. 1, 1984, pp. 1-2.

*Primary Examiner*—David A. Wiecking
*Assistant Examiner*—John S. Hilten
*Attorney, Agent, or Firm*—Fitzpatrick, Cella, Harper & Scinto

[57] ABSTRACT

A document output apparatus is disclosed which comprises a register for registering a handwritten character as a font; a digitizer for inputting to the apparatus information on a row of characters to be output; a CPU for changing as needed a predetermined pitch between characters and a predetermined pitch between lines which are output parameters; and a reader for reading from the register a font corresponding to the information on a row of characters that the digitizer has input. The CPU outputs the font read by the reader on the basis of the changed output parameters.

1 Claim, 1 Drawing Sheet

DOCUMENT OUTPUTTING APPARATUS INCLUDING MEANS TO RANDOMLY ALTER FONTS

This application is a continuation of application Ser. No. 07/355,108 filed May 19, 1989, which is a continuation of application Ser. No. 07/052,588 filed May 20, 1987, both now abandoned.

BACKGROUND OF THE INVENTION

1. Field of the Invention

This invention relates to a document output apparatus which is capable of outputting a row of handwritten characters.

2. Related Background Art

A computer-based "clean copy making system" which recognizes a document made by a word processor or the like, or a handwritten document, and outputs the recognized document using a predetermined font has been put to practical us due to the development and reduction of the cost of computers.

However, a document having such a computer-generated font is likely to lack human touches and to be irksome.

Although the function and performance of such devices has advanced, human beings might not appreciate these advance since they are used to handwritten documents. Thus, document output from such known devices tends to lack human touches and be irksome. This could cause a human being to feel alienation of mental stress.

SUMMARY OF THE INVENTION

It is therefore an object of this invention to provide a document outputting apparatus which is capable of registering a font of handwritten characters in advance, and changing the pitch between characters and the pitch between lines dynamically to output a document of human touches as a handwritten document.

It is another object of this invention to provide a document outputting apparatus which is capable of dynamically changing the size and inclination of characters, the pitch between characters and the pitch between lines individually or in combination as required to output a document of human touches.

DETAILED DESCRIPTION OF PREFERRED EMBODIMENT

Figure 1:
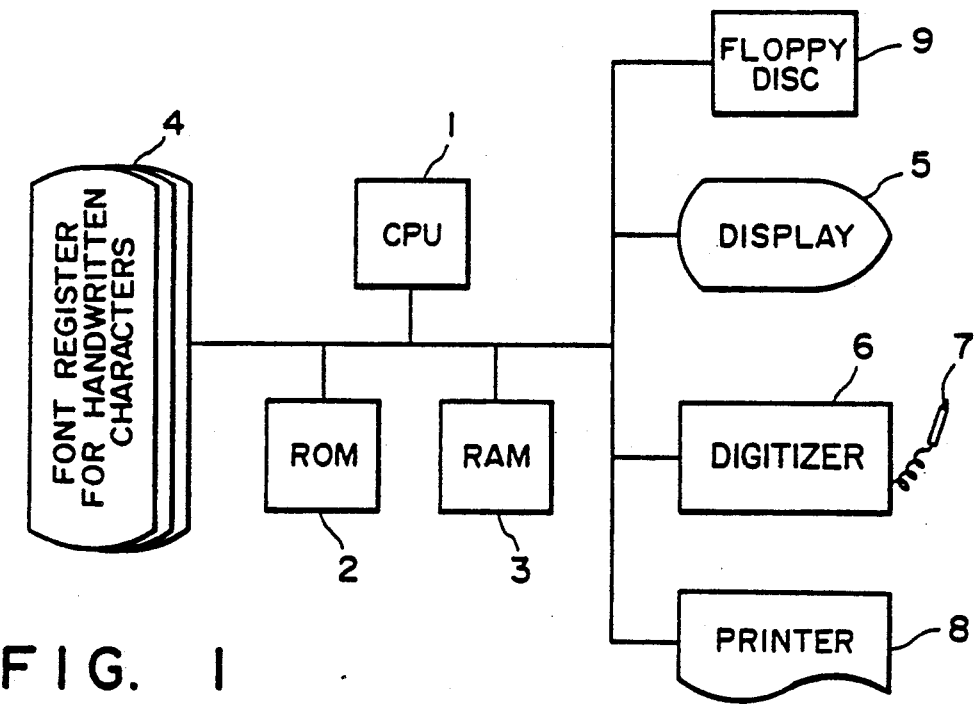
FIG. 1 is a schematic of a handwritten character forming apparatus as an embodiment of this invention.

An embodiment of this invention will now be described in detail with reference to the drawings. FIG. 1 is a schematic of a handwritten document forming apparatus which shows an embodiment of the outputting apparatus. This system includes an input device which inputs thereto handwritten characters and comprises a digitizer 6, a stylus 7 and a floppy disc 9; an output device comprising a liquid crystal display 5 or the like; a printer 8; a CPU 1 which controls these elements; a ROM 2 which stores programs; a RAM 3 for auxiliary storage; and a handwritten character font register 4 which register a handwritten character font therein.

This apparatus includes a combination of a regular word processor mechanism and a handwritten input device such as a digitizer 6. A document is usually made by outputting the document data, stored in external storage such as floppy disc 9, to printer 8 using a predetermined font.

In this embodiment, before outputting the data to printer 8, a font of the user's handwritten characters, registered in advance in register 4, is used. The size of a character font, the pitch between characters and the pitch between lines are dynamically changed individually or in combination as needed using random numbers to be output in a form similar to that of the handwritten document. It may be arranged that the pitch between characters, the pitch between lines, etc., can be changed as needed by the user's operation of keys etc. Such an operation allows a document of human touches and a marked personality to be easily produced. A character may be inclined by controlling the rotation of the pattern.

Figure 2:
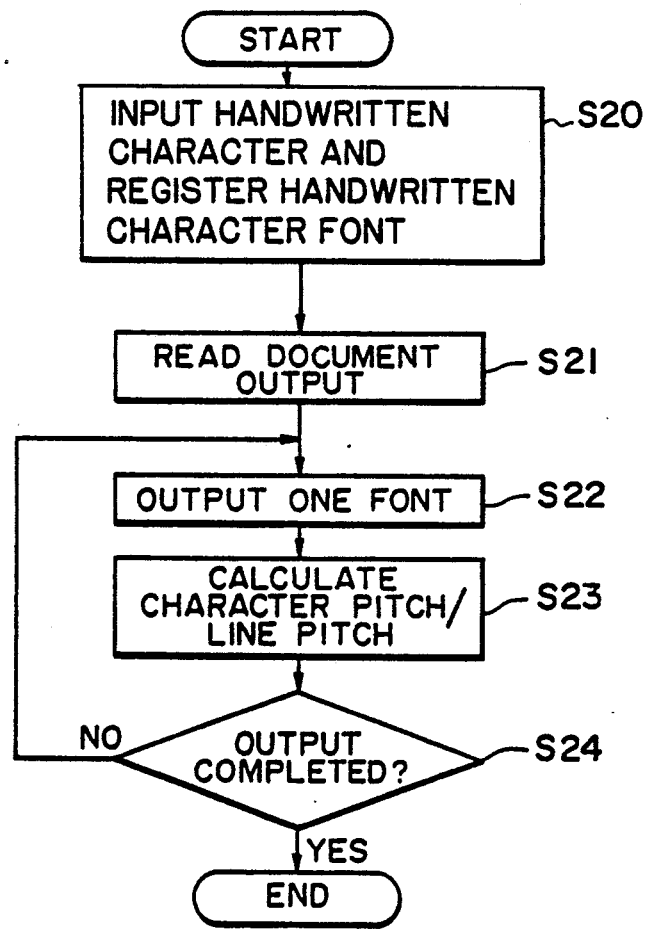
FIG. 2 is a flowchart for control of the hand written character forming apparatus.

FIG. 2 shows a control flowchart for the handwritten character forming apparatus, and is stored in ROM 2.

First, at step S20 a handwritten character is input by digitizer 6 and a font is registered in handwritten character font register 4. This causes a desired handwritten character to be registered as a font. At step S21 the output document is read from floppy disc 9. It is to be noted that the output document to be read is not limited to the information in floppies, but may be what is read from a handwritten document or what is input from outside.

At step S22 a first character is read from font register 4 and output to printer 8. At step S23 the pitch between characters is calculated and set using a random number. At step S24 it is determined whether or not the outputting is completed. If not, a return is made to step S22 to start to process the next character. At step S23, when outputting one line of characters is completed, the pitch between lines is calculated and set using a random number. It is to be noted that while in this embodiment the character and line pitches are calculated and set using random numbers, they may be set depending on the kind of a character, for example, Chinese character or Katakana character, or the size of a character.

This apparatus includes a combination of a regular word processor device and an input device such as a digitizer so that it is inexpensive.

According to this invention, a document outputting apparatus is provided which registers a font for handwritten characters in advance, and changes the size of pitch between characters and the pitch between lines dynamically as needed to make a handwritten document.

I claim:

1. A document output apparatus comprising;

means for registering a predetermined handwritten character font;

means for inputting information on a row of characters to be output;

means for deriving random numbers;

means for reading from said registering means a font corresponding to the information on the row of characters input by said inputting means;

means for obtaining data as to size and inclination of a character to be output and data as to character pitch and line pitch on the basis of the random numbers derived by said driving means; and means for outputting the font read by said reading means using a desired combination of the data obtained by said obtaining means as output parameters.

* * * * *

UNITED STATES PATENT AND TRADEMARK OFFICE
CERTIFICATE OF CORRECTION

PATENT NO. : 5,108,206
DATED : April 28, 1992
INVENTOR(S) : SHIGEO YOSHIDA It is certified that error appears in the above-identified patent and that said Letters Patent is hereby corrected as shown below:

On title page, item

[56] REFERENCES CITED - U.S. PATENT DOCUMENTS

"Wagle" should read --Nagle--.

COLUMN 1:

Line 20, "us" should read --use--;
Line 27, "advance" should read --advances--;
Line 28, "document" should read --a document--;
Line 30, "of" should read --or--;
Line 49, "hand written" should read --handwritten--;
Line 52, "PREFERRED" should read --THE PREFERRED--;
Line 65, "register" should read --registers--.

COLUMN 2:

Line 51, "comprising;" should read --comprising:--.

Signed and Sealed this

Fourteenth Day of September, 1993

Attest:

BRUCE LEHMAN

Attesting Officer   Commissioner of Patents and Trademarks